(12) United States Patent
George et al.

(10) Patent No.: US 11,686,400 B2
(45) Date of Patent: Jun. 27, 2023

(54) OIL VALVE

(71) Applicant: Power Flame Incorporated, Parsons, KS (US)

(72) Inventors: Kenneth R. George, Parsons, KS (US); David S. Neff, Parsons, KS (US)

(73) Assignee: Power Flame Incorporated, Parsons, KS (US)

( * ) Notice: Subject to any disclaimer, the term of this patent is extended or adjusted under 35 U.S.C. 154(b) by 0 days.

(21) Appl. No.: 17/879,401

(22) Filed: Aug. 2, 2022

(65) Prior Publication Data

US 2023/0055194 A1 Feb. 23, 2023

Related U.S. Application Data

(60) Provisional application No. 63/234,955, filed on Aug. 19, 2021.

(51) Int. Cl.
| | |
|---|---|
| *F16K 5/04* | (2006.01) |
| *F16K 15/06* | (2006.01) |
| *F16K 3/26* | (2006.01) |
| *F16K 5/12* | (2006.01) |
| *F16K 37/00* | (2006.01) |

(52) U.S. Cl.
CPC ............... *F16K 15/06* (2013.01); *F16K 3/26* (2013.01); *F16K 5/0407* (2013.01); *F16K 5/12* (2013.01); *F16K 37/0016* (2013.01)

(58) Field of Classification Search
CPC .... F16K 5/0407; F16K 5/0414; F16K 5/0471; F16K 5/10; F16K 5/12
See application file for complete search history.

(56) References Cited

U.S. PATENT DOCUMENTS

| | | | | |
|---|---|---|---|---|
| 2,987,078 A | * | 6/1961 | Du Perow | F16K 5/106 |
| | | | | 137/601.19 |
| 3,354,904 A | * | 11/1967 | Federle | F16K 5/10 |
| | | | | 137/556.6 |
| 5,242,150 A | * | 9/1993 | Shiffler | F16K 47/045 |
| | | | | 251/212 |

(Continued)

FOREIGN PATENT DOCUMENTS

WO WO-2022244003 A1 * 11/2022

OTHER PUBLICATIONS

International Search Report and Written Opinion for PCT/US2022/40022, dated Nov. 4, 2022, 13 pages.

*Primary Examiner* — Hailey K. Do
(74) *Attorney, Agent, or Firm* — Chambliss, Bahner & Stophel, P.C.; Stephen D. Adams (57) ABSTRACT

A valve stem for use in a fluid flow control valve having a valve body configured to receive a portion of the valve stem and to enable the valve stem to selectively rotate within the valve body between a fully-open position, where fluid is permitted to flow through the fluid flow control valve, and a fully-closed position, where fluid is prevented from flowing through the fluid flow control valve. The valve stem includes an elongate valve stem arm having a first end and a second end and a valve stem head integrally formed with and fixedly attached to the second end of the valve stem arm. The valve stem head includes a fluid inlet formed in the valve stem head, and a fluid outlet formed in the valve stem head, and a fluid passage that directs fluid from the fluid inlet, through the valve stem, and out of the fluid outlet.

15 Claims, 6 Drawing Sheets

(56) References Cited

U.S. PATENT DOCUMENTS

| | | | |
|---|---|---|---|
| 6,726,175 B1 | 4/2004 | Saba et al. | |
| 6,808,162 B2 * | 10/2004 | Tranovich | F16K 5/0407 251/283 |
| 10,006,550 B2 * | 6/2018 | Huang | F16K 5/0207 |
| 2001/0032675 A1 | 10/2001 | Russell | |
| 2007/0180813 A1 | 8/2007 | Pickard et al. | |
| 2014/0084198 A1 | 3/2014 | Ikeda et al. | |
| 2018/0335161 A1 | 11/2018 | Ansell | |

\* cited by examiner

OIL VALVE

CROSS REFERENCE TO RELATED APPLICATIONS

This application claims the benefit of U.S. Provisional Application No. 63/234,955 filed Aug. 19, 2021, and entitled "Oil Valve," the content of which is incorporated herein by reference in its entirety.

FIELD

The present disclosure relates to fluid control valves. More particularly, the present disclosure relates to a modulating liquid control valve that may be used in combustion and non-combustion applications.

BACKGROUND

Fluid flow control valves are often used in combustion applications and non-combustion applications in order to control the flow of a fluid from one place to another place. One example of a combustion application where fluid flow control valves are often used is in burner assemblies, such as a burner assembly used in connection with the production of asphalt. In a typical asphalt production plant, a burner assembly might be used for drying and heating aggregate materials and for heating one or more asphalt sources, which may then be used in creating a final asphalt mix. In the asphalt production process, as with most processes that utilize a process burner, carefully controlling the flame characteristics (e.g., temperature, flame shape, emissions, etc.) are frequently important for achieving a successful, desired outcome.

One of the factors that determines the flame characteristics is the fuel-to-air ratio during the combustion process. The fuel-to-air ratio is a measure of the ratio of the amount of fuel to the amount of air that is mixed during a combustion process. Among other things, this ratio determines whether combustion can even take place, how much energy it releases, and also whether the combustion process is complete (i.e., "clean") or whether it releases unwanted pollutants. A ratio that is ideally mixed and burns completely is called a "stoichiometric" mixture. On the other hand, a mixture is "rich" if the amount of fuel is too high for a given amount of air or "lean" if the amount of air is too high for a given amount of fuel. In certain situations, it may be desirable to have a rich mixture or a lean mixture. For example, rich mixtures are less efficient but produce more power and burn cooler. On the other hand, lean mixtures are more efficient but produce higher temperatures and can produce higher levels of unwanted pollutants. However, in most cases, it is generally desirable to maintain a stoichiometric mixture.

As noted above, maintaining a desired fuel-to-air ratio requires carefully controlling the amounts of fuel and air that are provided to the combustion process. A variety of fluid flow control valves have been used for this purpose, including adjustable port valves, globe valves, butterfly valves, ball valves, etc. However, it has been found that these conventional valves suffer from a number of problems that have made them less than ideal for accurately controlling and consistently maintaining a desired flow rate over time and over a large number of cycles. A primary issue with each of these conventional valve designs is that they are too complicated and have too many moving parts. Over time, as these valves are cycled, the parts begin to wear. This often results in the valve "drifting" over time, which is the unintentional movement of the valve away from a desired position or set point. Valve drift also impacts the reliability or repeatability of accurately setting a valve at a desired set point. This results in increased hysteresis, which is sometimes thought of as a measure of the "play" or "slop" in the valve at a given set point. As an example, for a given set point (i.e., flow rate) in a fluid flow control valve, the range of possible actual flow rates will be wide if there is high hysteresis. On the other hand, in a control valve having low or no hysteresis, the range of possible actual flow rates will be much narrower for the same given set point.

What is needed, therefore, is a fluid flow control valve that is simpler in design than conventional valve designs, that reduces wear, and that also reduces hysteresis in order to maintain a more accurate fluid flow control over time and over many cycles.

Notes on Construction

The use of the terms "a", "an", "the" and similar terms in the context of describing embodiments or implementations of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The term "operatively connected" is such an attachment, coupling or connection that allows the pertinent structures to operate as intended by virtue of that relationship.

As used below, the term "circumferentially" means in a direction around the perimeter of a component. For example, in a valve stem head that is cylindrical in shape, traveling "circumferentially" around the valve stem head means to travel around the valve stem head in a travel path that is circular in shape.

The use of any and all examples or exemplary language (e.g., "such as" and "preferably") herein is intended merely to better illuminate the invention and the preferred embodiments or implementations thereof, and not to place a limitation on the scope of the invention. Nothing in the specification should be construed as indicating any element as essential to the practice of the invention unless so stated with specificity.

SUMMARY OF THE INVENTION

In some aspects, the techniques described herein relate to a valve stem for use in a fluid flow control valve having a valve body configured to receive a portion of the valve stem and to enable the valve stem to selectively rotate within the valve body between a fully-open position, where fluid is permitted to flow through the fluid flow control valve, and a fully-closed position, where fluid is prevented from flowing through the fluid flow control valve, the valve stem including: an elongate valve stem arm having a first end and a second end; a valve stem head integrally formed with and fixedly attached to the second end of the valve stem arm, the valve stem head having: a second fluid inlet formed in the valve stem head; a second fluid outlet formed in the valve stem head; and a fluid passage that carries fluid into the valve stem via the second fluid inlet and then out of the valve stem via second fluid outlet In some aspects, the techniques described herein relate to a valve stem wherein the valve stem head further includes: a continuous peripheral wall having opposing front and back sides; a front face located on the front side of the peripheral wall; and a back face located opposite the front face on the back side of the peripheral wall, wherein the second end of the valve stem arm is fixedly attached to the front face of the valve stem head, the second fluid inlet is formed in the peripheral wall of the valve stem head, and the second fluid outlet is formed in the back face of the valve stem head.

In some aspects, the techniques described herein relate to a valve stem further including an elongate canal formed by opposing walls in the peripheral wall and extending circumferentially around a portion of the valve stem head such that a first end of the canal is located at a first circumferential location of the valve stem head and a second end of the canal is located at a second circumferential location of the valve stem head, wherein the second fluid inlet is disposed in the canal, wherein outer surface portions of the peripheral wall that are located adjacent the opposing walls of the canal are configured to restrict fluid flow from the valve body into the valve stem in order modulate fluid flow through the fluid flow control valve.

In some aspects, the techniques described herein relate to a valve stem wherein the canal forms a crescent shape when viewed from one of the sides of the peripheral wall and opposing ends of the crescent shape are tapered such that a widest portion of the crescent shape of the canal is located between the first and second ends of the canal.

In some aspects, the techniques described herein relate to a valve stem further including a center of the canal that is circumferentially centered between the first and second ends of the canal, wherein the second fluid inlet is located at the center of the canal, the canal including: a first portion located between the center of the canal and the first end of the canal that has a first canal shape; and a second portion located between the center of the canal and the second end of the canal that has a second canal shape.

In some aspects, the techniques described herein relate to a valve stem further wherein a shape of the first portion of the canal mirrors a shape of the second portion of the canal about a line passing through the center of the canal.

In some aspects, the techniques described herein relate to a valve stem wherein the first canal shape and the second canal shape, in combination, form a pointed oval shape that is centered at the center of the canal and at the second fluid inlet.

In some aspects, the techniques described herein relate to a valve stem wherein the canal is formed by a pair of opposing planar walls.

In some aspects, the techniques described herein relate to a valve stem wherein: the canal is formed by a pair of opposing walls that each have an inner end and an outer end, the inner ends of the opposing walls meet at an intersection and form a base of the canal, and each of the opposing walls is angled outwards from one another and from the intersection point and towards one of opposing front and back sides of the peripheral wall.

In some aspects, the techniques described herein relate to a valve stem wherein the outer ends of the opposing walls are spaced apart by a distance D, and wherein distance D continuously changes between the first and second ends of the canal.

In some aspects, the techniques described herein relate to an oil metering valve that includes the valve stem, the oil metering valve further including: a valve body having: a first fluid inlet; a first fluid outlet; a valve stem receiver configured to receive the valve stem head of the valve stem; and a fluid passage that carries fluid into the valve body via the first fluid inlet, through the valve stem receiver, and then out of the valve body via first fluid outlet a bearing for enabling the valve stem head be rotated with respect to the valve body; and a cap having an aperture, wherein the valve stem is sized and configured such that the valve stem arm may be inserted through the aperture of the cap and the cap may be fixedly attached to the valve body, wherein, when the valve stem is located within the valve stem receiver, the outer surface portions of the peripheral wall are configured to be located adjacent the first fluid inlet of the valve body and to provide a variable restriction to fluid flowing from the valve body into the valve stem based on the rotational position of the valve stem relative to the valve body in order modulate fluid flow through the fluid flow control valve.

In some aspects, the techniques described herein relate to an oil metering valve wherein the valve body further includes: a continuous peripheral wall having opposing front and back sides; a front face located on the front side of the peripheral wall; and a back face located opposite the front face on the back side of the peripheral wall.

In some aspects, the techniques described herein relate to an oil metering valve wherein the first fluid inlet and first fluid outlet are each formed in the continuous peripheral wall of the valve body and the valve stem receiver is disposed in the front face of the valve body.

In some aspects, the techniques described herein relate to an oil metering valve further including a rotating indicator collar mounted to the first end of the valve stem arm.

In some aspects, the techniques described herein relate to an oil metering valve further including a stationary flow indicator having a visual readout that cooperates with the rotating indicator to indicate an open-close position of the valve as the valve stem is rotated within the valve body.

In some aspects, the techniques described herein relate to an oil metering valve wherein the valve stem is configured to rotate within the valve body from the fully-open position counterclockwise to a first fully-closed position and further configured to rotate within the valve body from the fully-open position clockwise to a second fully-closed position.

In some aspects, the techniques described herein relate to a bi-direction fluid flow metering valve including: a valve body having: a first fluid inlet; a first fluid outlet; a valve stem receiver; and a first fluid passage that directs fluid from the first fluid inlet, through the valve stem receiver, and then out of the first fluid outlet; a valve stem having: an elongate valve stem arm having a first end and a second end; a valve stem head integrally formed with and fixedly attached to the second end of the valve stem arm, the valve stem head sized and configured for rotatable insertion within the valve stem receiver of the valve body and the valve stem head having: a peripheral wall; a second fluid inlet and a second fluid outlet that are each formed in the peripheral wall; a second fluid passage that directs fluid from the second fluid inlet and then out of the second fluid out; and an elongate canal formed by opposing walls formed in the peripheral wall and extending circumferentially around a portion of the valve stem head such that a first end of the canal is located at a first circumferential location of the valve stem head and a second end of the canal is located at a second circumferential location of the valve stem head, wherein the second fluid inlet is disposed in the canal, wherein, when the valve stem is located within the valve stem receiver, outer surface portions of the peripheral wall that are located adjacent the opposing walls of the canal are configured to be located adjacent the first fluid inlet of the valve body and to provide a variable restriction to fluid flowing from the first inlet of the valve body into canal based on a rotational position of the valve stem relative to the valve body in order modulate fluid flow through the flow metering valve, and wherein the valve stem is configured to rotate within the valve body: counterclockwise from a fully-open position, where fluid is permitted to flow through the fluid flow metering valve, to a first fully-closed position, where fluid is prevented from flowing through the fluid flow metering valve; and clockwise from the fully-open position to a second fully-closed position.

In some aspects, the techniques described herein relate to a bi-direction fluid flow metering valve wherein: the opposing walls of the canal each have an inner end and an outer end; the inner ends of the opposing walls meet at an intersection and form a base of the canal; the opposing walls are angled outwards from one another and from the intersection point and towards opposing front and back sides of the peripheral wall; and the outer ends of the opposing walls are spaced apart by a distance D that continuously changes between the first and second ends of the canal.

In some aspects, the techniques described herein relate to a bi-direction fluid flow metering valve wherein the canal has a pointed oval shape in a first orientation and a crescent shape in a second orientation.

In some aspects, the techniques described herein relate to a method for controlling a flow of a fluid including the steps of: providing a bi-direction fluid flow metering valve including: a valve body; a valve stem having an elongate valve stem arm and a valve stem head integrally formed with and fixedly attached to the valve stem arm, the valve stem head sized and configured to rotate within the valve body: (1) counterclockwise from a fully-open position, where fluid is permitted to flow through the valve body and the valve stem, to a first fully-closed position, where fluid is prevented from flowing through the valve stem; and (2) clockwise from the fully-open position to a second fully-closed position; providing a fluid to the bi-direction fluid flow metering valve; based on an orientation of the valve stem with respect to the valve body, either (1) preventing fluid from passing through the valve stem; or (2) permit at least a portion of the fluid to pass through the valve body and the valve stem; and rotating the valve stem with respect to the valve body in order to modify an amount of fluid permitted to flow through the valve stem.

BRIEF DESCRIPTION OF DRAWINGS

Further advantages of the invention are apparent by reference to the detailed description when considered in conjunction with the figures, which are not to scale so as to more clearly show the details, wherein like reference numerals represent like elements throughout the several views, and wherein.

DETAILED DESCRIPTION

Referring now to the drawings in which like reference characters designate like or corresponding characters throughout the several views, there is shown in FIGS. 1-5, a bi-direction fluid flow metering valve 100 according to an implementation of the present disclosure. Valve 100 may be used as an oil or fuel metering valve used in a burner of an asphalt production plant, in other process burners, or in entirely different operations where the flow of a fluid must be accurately and reliably monitored and controlled over time and over many cycles.

Valve 100 includes a valve body 102 having a first fluid inlet 104, a first fluid outlet 106, a valve stem receiver 108, and a first fluid passage (a portion of which is indicated by Ref. No. 110 in FIG. 5) that carries fluid into the valve body via the first fluid inlet, through the valve stem receiver, and then out of the valve body via first fluid outlet.

Valve 100 also includes a valve stem 112 that works in conjunction with the valve body 102 to control fluid flow through the valve. Valve stem 112 includes an elongate valve stem arm 114 that is integrally formed with and is fixedly attached to a valve stem head 116 so as to form a unitary component. Valve stem head 116 is sized and configured for rotatable insertion into the valve stem receiver 108 of the valve body 102 such that the valve stem 112 may be rotated with respect to the valve body. A bearing 118 is placed around valve stem head 116 and inside of valve stem receiver 108 to enable the valve stem head to be rotated with respect to the valve body 102.

Valve stem head 116 includes a second fluid inlet 120, a second fluid outlet 122, and a second fluid passage (a portion of which is indicated by Ref. No. 124 in FIG. 5) that carries fluid into the valve stem head via the second fluid inlet out of the valve stem head via the second fluid outlet. When valve stem head 116 is located within the valve stem receiver 108, it forms part of the first fluid passage 110 of the valve body 102. As such, fluid that enters the first fluid inlet 104 of the valve body 102 must pass through the valve stem head 116 before it can pass out of the valve body via first fluid outlet 106.

As further detailed below, due to the presence of a canal 126, which is formed in the valve stem head 116 and surrounds second fluid inlet 120, fluid may be permitted or prevented to flow through the stem valve head based on the orientation of the valve stem 112 with respect to the valve body 102. Consequently, by simply rotating valve stem 112 within the valve body 102, fluid flow through the valve 100 may be permitted and reliably set at a desired flow rate or prevented entirely.

Valve Body

Further details of the valve body 102 will now be provided. The valve body 102 is formed by a continuous peripheral wall 128 having a front side 130 and an opposing back side 132. A front face 134 is located on the front side 130 of the peripheral wall 128 and a back face 136 is located opposite the front face on the back side 132 of the peripheral wall. The first fluid inlet 104 and first fluid outlet 106 are each formed in the continuous peripheral wall 128 of the valve body 102 and the valve stem receiver 108 is provided in the front face 134 of the valve body.

Valve Stem

Further details of the valve stem 112 and other components of the valve 100 will now be provided. Like the valve body 102, the valve stem head 116 also includes a continuous peripheral wall 138 having a front side 140 and an opposing back side 142. A front face 144 is located on the front side 140 of the peripheral wall 138 of the valve stem 112 and a back face 146 is located opposite the front face on the back side 142 of the peripheral wall. The second fluid inlet 120 is formed in the peripheral wall 138 of the valve stem head 116, and the second fluid outlet is formed in the back face 146 of the valve stem head. The valve stem arm 114 includes a first end 148 and a second end 150. The second end 150 of the valve stem arm 114 is integrally formed with and is fixedly attached to the front face 144 of the valve stem head 116. As noted above, bearing 118 is placed around valve stem head 116 and inside of valve stem receiver 108 to enable the valve stem head to be rotated with respect to the valve body 102. Rotation between bearing 118 and valve body 102 can be prevented using mechanical arresting means 152, such as a spring pin, which is fitted into corresponding slot halves 153 formed on an outside surface of the bearing 118 and the inside surface of the valve stem receiver 108. One or more seals 154 (e.g., O-ring seals) and washers 155 are then used to provide a leak-resistant or, more preferably, a leak-proof seal. A cap 156 having a central aperture (not shown) is then placed onto the valve stem arm 114 by inserting the valve stem arm through the aperture. Next, a stationary flow indicator 158 having a central aperture is then placed onto the valve stem arm 114 by inserting the valve stem arm through the aperture. Fasteners 160 are then inserted through pairs of corresponding openings 162 in the cap 156 and flow indicator 158 and the fasteners are then secured in corresponding openings 164 formed in the valve body 102, which secures the valve stem 112 and bearing 118 within the valve stem receiver 108 of the valve body 102. Finally, a rotating indicator collar 166 is placed onto the first end 148 of the valve stem arm 114 and is secured or fixedly mounted by a mechanical arresting means 152 that is inserted into corresponding openings 168 located in both the collar 166 and valve stem arm 114. The valve stem 112, including the valve stem head 116, may be rotated by turning the indicator collar 166. As the valve stem 112 is rotated via the indicator collar 166. The indicator collar 166 works cooperatively with the stationary flow indicator 158 to provide a visual readout or indication of when the valve 100 is in a fully-closed position, fully-open position, or a number of partially open positions.

Canal Design

Now, in FIGS. 6A-11, there is provided three separate sets of views of the valve stem head 116 placed into three different orientations with respect to the valve body 102. Also shown in certain of these several views is the relative position of the first fluid inlet 104 and the second fluid inlet 120 at each of these three different orientations. In particular, in FIGS. 6A-6C, the valve stem 112 is shown in a fully-open rotational position; in FIGS. 7A-7C, the valve stem is shown in a partially-open rotational position; and, in FIGS. 8A-8C, the valve stem is shown in a fully-closed rotational position. In FIGS. 6C, 7C, and 8C, the peripheral wall 138 of the valve stem head 116 is shown in an "unrolled" or flattened configuration in order to more clearly illustrate the relative position of the first fluid inlet 104 and the second fluid inlet 120 when the valve 100 is in each rotational position.

Figure 9:
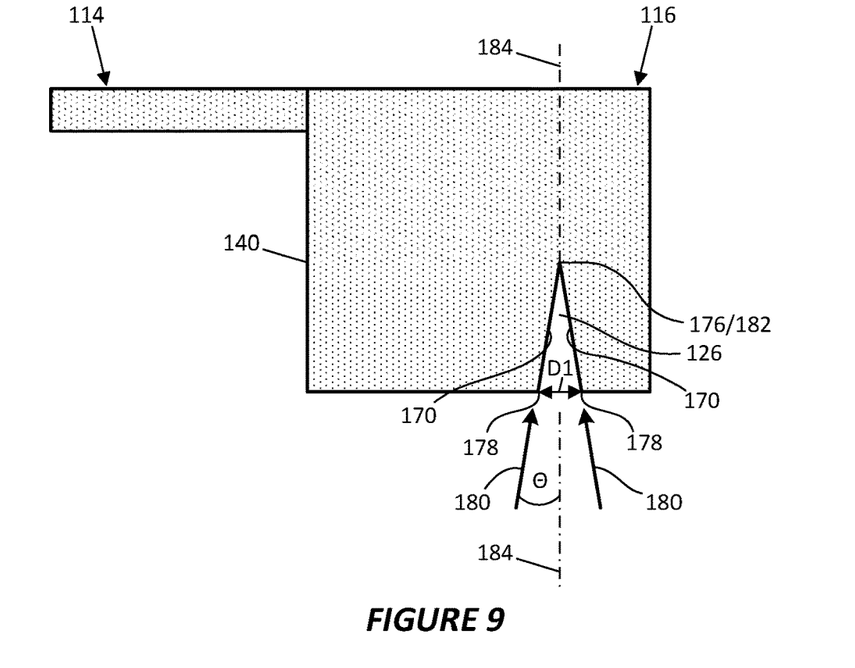
FIG. 9 illustrates a valve stem and a pair of cuts used in forming a canal having planar opposing walls in a valve stem head of the valve stem.

As illustrated in these several views, the valve stem head 116 includes an elongate canal 126 that is formed by opposing walls 170 formed in the peripheral wall 138 and that extends circumferentially around a portion of the valve stem head such that a first end 172 of the canal is located at a first circumferential location of the valve stem head and a second end 174 of the canal is located at a second circumferential location of the valve stem head. The second fluid inlet 120 is located in the canal 126. As shown best in FIGS. 6A and 9, the opposing walls 170 that form the canal 126 each have an inner end 176 and an outer end 178. The surface of the wall 170 between the inner and outer ends 176, 178 may be planar (i.e., "flat") or may be curved or non-planar. However, as illustrated in FIG. 9, if the walls 170 are planar, the canal 126 may be more easily formed during the manufacturing process using a pair of angled cuts (orientation and direction of such cut indicated by arrow 180), such as with an angle grinder or another similar tool and without the need for specialized (i.e., expensive and time consuming) cutting tooling and/or machining techniques.

The inner ends 176 of the opposing walls 170 preferably meet at an intersection point 182 and form a base of the canal. Then, each of the walls 170 is angled outwards from one another and from the intersection point 182 and towards one of the sides of the peripheral wall 138 (only front side 140 is shown in FIG. 9) at an angle Θ, as measured between each respective cut 180 and a vertical axis 184 (as shown in FIG. 9) extending radially outwards from a center (not shown) of the valve stem head 116 and through the intersection point 182. In certain non-limiting implementations, angle Θ is in the range of 0° to 60°. However, in other implementations, angles greater than 60° may also be suitable as well. As a result of the angled walls 170, the outer ends 178 of the walls 170 are spaced apart from one another by a distance D1, which is measured along a line that is orthogonal to a line L1 extending between the first and second ends 172, 174 of the canal 126. Likewise, the inner and outer ends 176, 178 of each of the walls 170 are spaced apart from one another by a distance D2, which is measured along a line L2 (one of an infinite number of possible such lines shown in FIG. 11) extending radially outwards from a center 185 of the valve stem head 116. In preferred implementations, distances D1 and D2 continuously change between the first end 172 and the second end 174 of the canal 126. As a result and as described below, the canal 126 preferably has different shapes when viewed from different perspectives.

Figure 10:
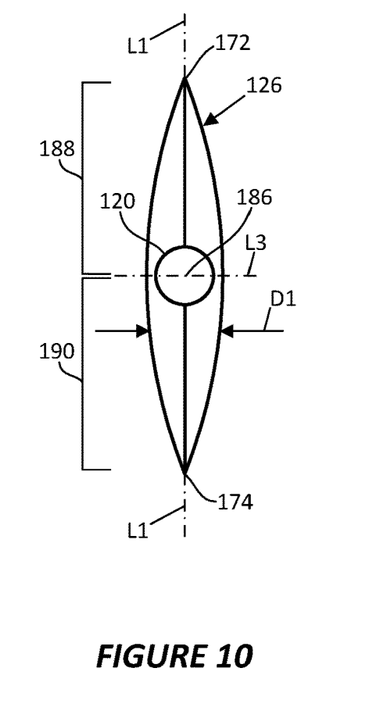
FIG. 10 is an isolated view of a canal of the valve stem shown in FIG. 8A, shown from a perspective of looking down onto the unrolled valve stem head.
Figure 11:
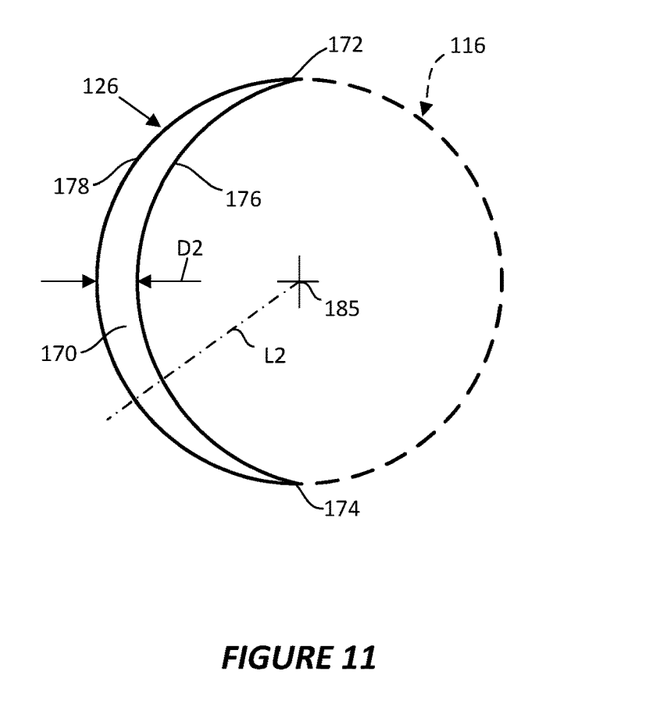
FIG. 11 is an isolated view of a canal of the valve stem shown in FIG. 8B, shown from a perspective from a back side of the peripheral wall of the valve stem head.

First, as shown best in FIG. 10, the canal 126 has a first shape from a perspective of looking down onto a flattened valve stem head 116. The canal 126 includes a center 186 that is circumferentially centered between the first and second ends 172, 174 and, preferably, the second fluid inlet 120 is located at the center of the canal. A first portion 188 of the canal 126 is located between the center 186 and the first end 172 to provide a first canal shape and a second portion 190 of the canal is located between the center and the second end 174 to provide a second canal shape. Preferably, the first canal shape mirrors the second canal shape about a line L3 (and L1) passing through the center 186 of the canal 126. Even more preferably, the first canal shape and the second canal shape, in combination, form a pointed oval shape that is centered at the center 186 of the canal 126 and at the second fluid inlet 120. Next, as shown best in FIG. 11, the canal 126 has a second shape from a perspective taken from a back side 142 (FIG. 8A) of the peripheral wall 138 of the valve stem head 116. It is noted that the crescent shape would be reversed if taken from the perspective of the front side 140 of the peripheral wall 138 of the valve stem head 116. In this configuration, distance D2 continuously changes such that opposing first and second ends 172, 174 of the canal 126 are tapered such that a widest portion of the crescent shape of the canal is located between the first and second ends of the canal.

As mentioned previously, forming the canal 126 with planar walls 170 using two cuts 180 (shown in FIG. 9) that meet at the intersection point 182 greatly simplifies the manufacturing process. It can be seen from the above discussion that making these same two cuts 180 also forms a canal 126 that is simultaneously a pointed oval shape in one perspective and a crescent shape in a different perspective.

Use of Valve

The operation of the valve 100 will now be detailed. The valve 100 is designed to be selectively moved from a fully-open position, shown in FIGS. 6A-6C, where fluid is permitted to freely flow through the fluid flow control valve, to a fully-closed position, shown in FIGS. 8A-8C, where fluid is prevented from flowing through the fluid flow control valve. The valve is also configured to operate in a range of partially-open positions between the fully-open and fully-closed positions. In these partially-open positions, fluid is still permitted to flow through the valve 100 but is obstructed or reduced by the valve stem head 116. Consequently, these partially-open positions enable the valve 100 to be precisely set to enable a desired level of fluid flow. Advantageously, the valve is moved between these various operating positions simply by rotating the valve stem 112 with respect to the valve body 102.

Figure 1:
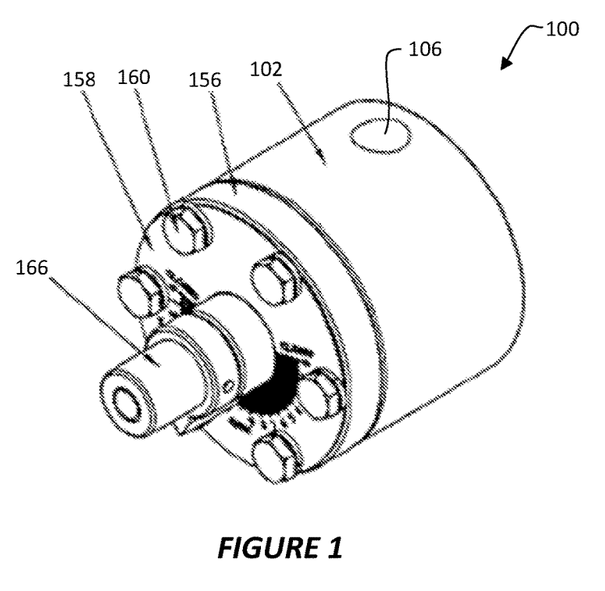
FIG. 1 is a perspective view illustrating a valve according to an implementation of the present disclosure.
Figure 2:
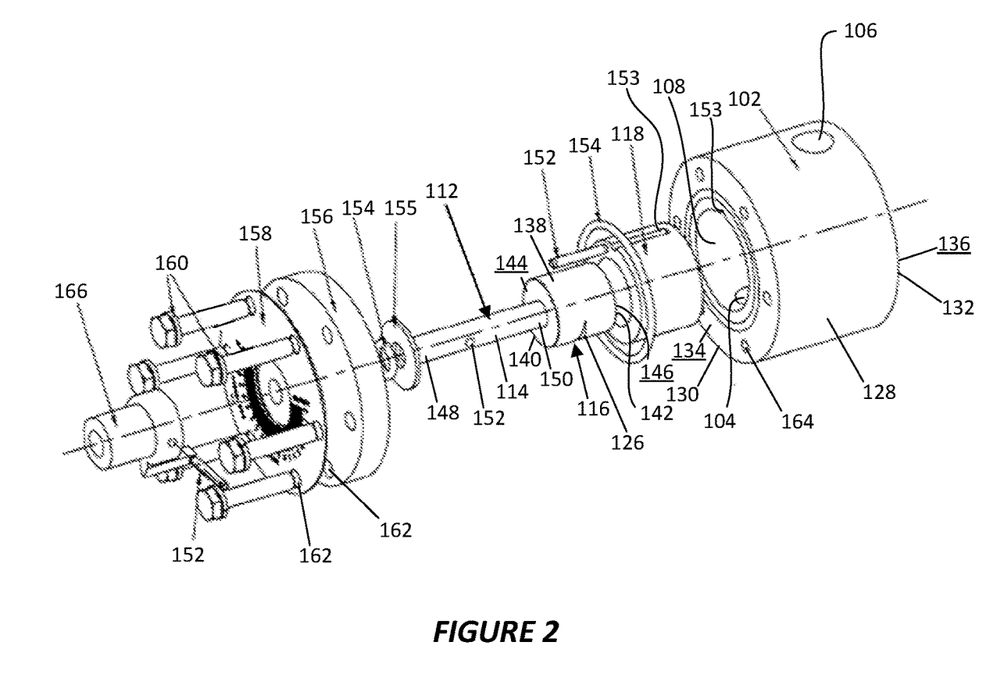
FIG. 2 is an exploded view of the valve shown in FIG. 1.
Figure 3:
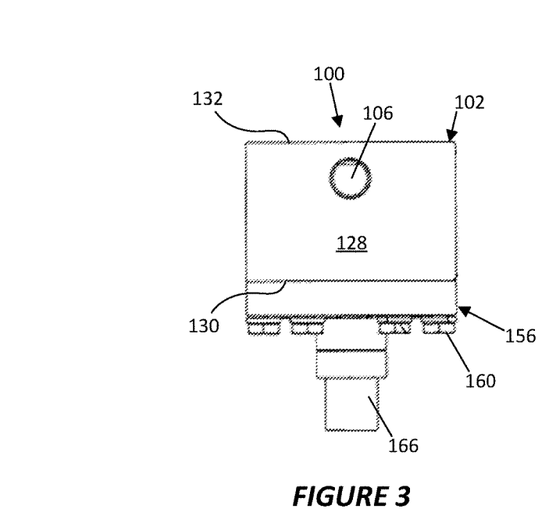
FIG. 3 is a top view of the valve shown in FIG. 1.
Figure 4:
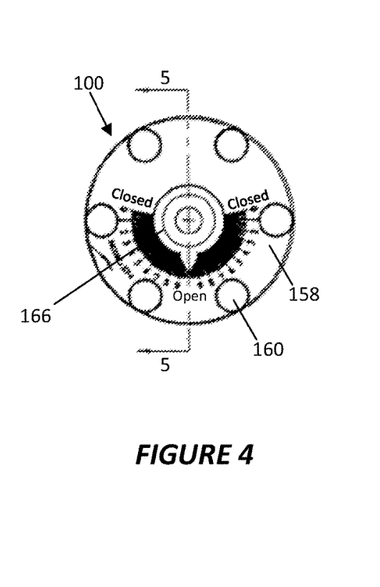
FIG. 4 is a front view of the valve shown in FIG. 1.
Figure 5:
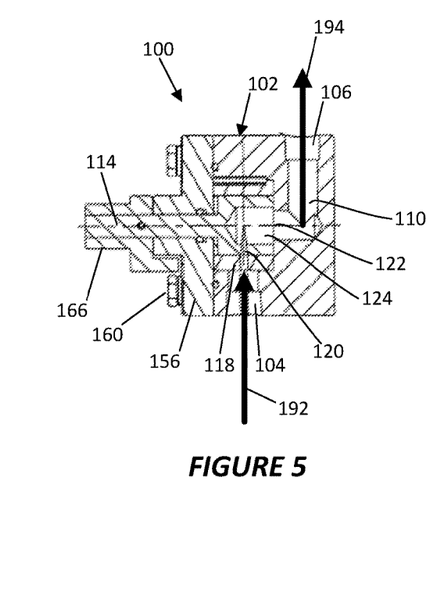
FIG. 5 is a sectional view of the valve shown in FIG. 4 and taken along line "5-5.
Figure 6A:
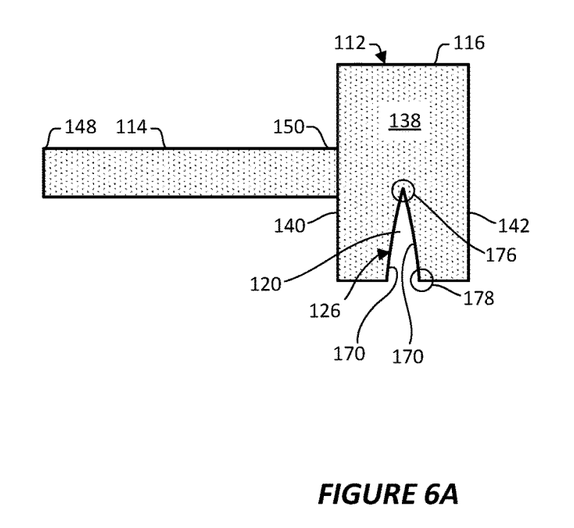
FIG. 6A is a side view illustrating a valve stem according to an implementation of the present disclosure, wherein the stem is shown in a fully-open rotational position.
Figure 6B:
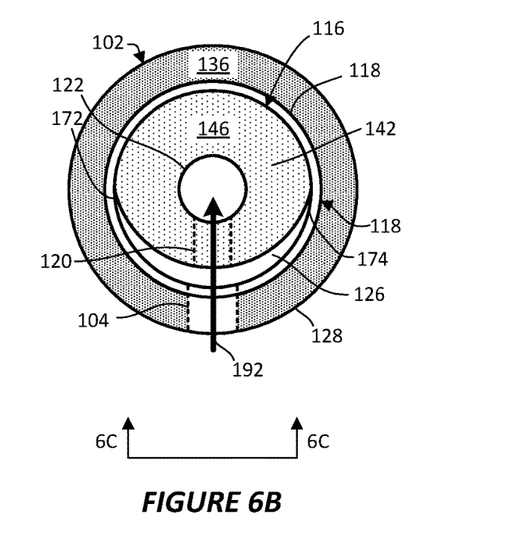
FIG. 6B illustrates the valve stem shown in FIG. 6A placed within a valve body.
Figure 6C:
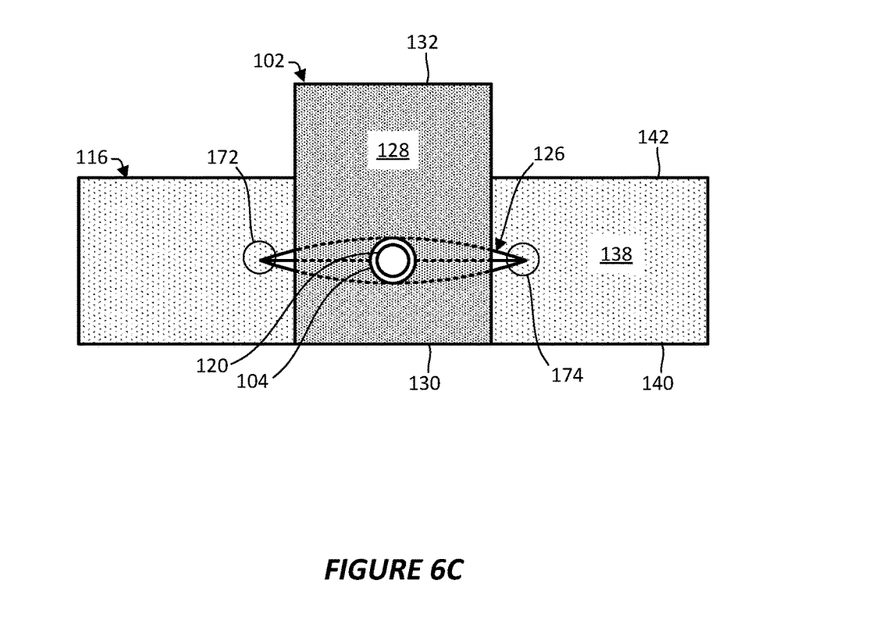
FIG. 6C is a sectional view of the valve body of FIG. 6B shown along line "6C-6C" and also showing the valve stem head in an "unrolled" or flattened configuration in order to better illustrate the relative position of a fluid inlet of the valve body to a fluid inlet of the valve stem.

With reference to FIGS. 2 and 5 and also to FIGS. 6A-6C, where the valve 100 is shown in a fully-open rotational position, it may be seen that the valve stem 112 is oriented within the valve body 102 such that the second fluid inlet 120 is pointed directly at and is aligned with the first fluid inlet 104. As shown by arrow 192, which represents a fluid entering the valve body 102, the path for fluid flow is unobstructed and the fluid can pass through the first fluid inlet 104, then through the canal 126, and then through the second fluid inlet of the valve stem head 116. This can be most clearly seen in FIG. 6C, where the first and second fluid inlets 104, 120 are perfectly aligned with within another so that they are concentric. Thus, a clear path for fluid flow is provided. Next, as shown by arrow 194, which represents a fluid exiting the valve body 102, the fluid then flows out of the valve stem head 116 via the second fluid outlet 122 and then out of the valve body 102 via the first fluid outlet 106.

Figure 7A:
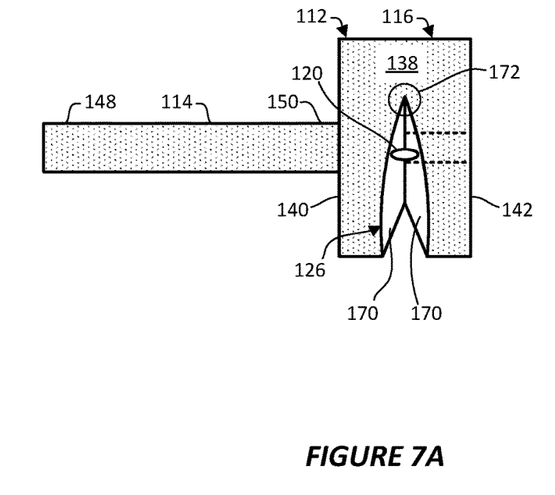
FIG. 7A is a side view illustrating the valve stem of FIG. 6A shown in a partially-open rotational position.
Figure 7B:
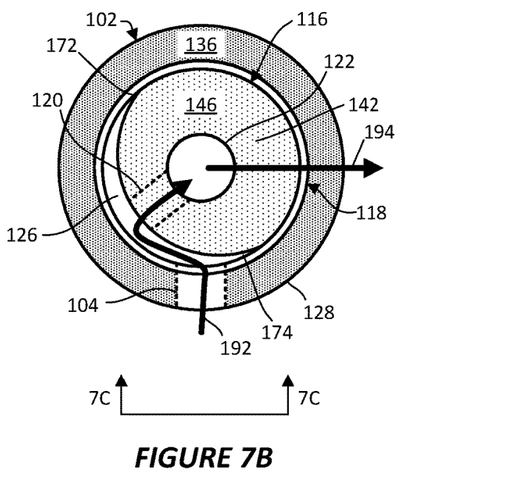
FIG. 7B illustrates the valve stem shown in FIG. 7A placed within a valve body.
Figure 7C:
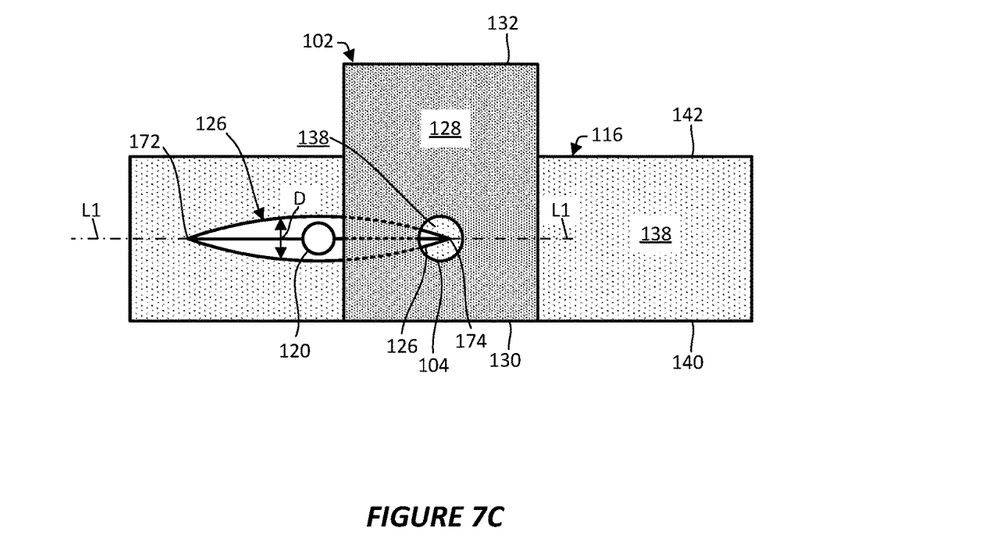
FIG. 7C is a sectional view of the valve body of FIG. 7B shown along line "7C-7C" and also showing the valve stem head in an "unrolled" or flattened configuration in order to better illustrate the relative position of a fluid inlet of the valve body to a fluid inlet of the valve stem.

With continued reference to FIGS. 2 and 5 and with reference now to FIGS. 7A-7C, where the valve 100 is shown in a partially-open rotational position, it may be seen that the valve stem 112 has been rotated approximately 45° within the valve body 102 such that the second fluid inlet 120 is pointed in southwestern direction but the first fluid inlet 104 is pointed in southern direction and, therefore, is not directly aligned with the second fluid inlet. As shown in FIG. 7C, the path for fluid entering the valve via the first fluid inlet 104 is partially unobstructed by outer surface portions of the peripheral wall 138 of the valve stem head 116 that are located adjacent the canal 126. However, the path for fluid flow is not blocked entirely because fluid can still pass from the first fluid inlet 104 through a portion of the canal 126 that is still pointed towards the first fluid inlet.

It may be appreciated that the fluid flow is reduced when more of the peripheral wall 138 is located adjacent the first fluid inlet 104 and, therefore, blocks fluid from passing into the valve stem head 116. On the other hand, fluid flow is increased when more of the canal 126 is located adjacent the first fluid inlet 104. Thus, between the fully-open and fully-closed positions, the amount of exposure of peripheral wall 138 to the first fluid inlet 104 compared to the amount of exposure of the canal 126 to the first fluid inlet determines the variable amount of fluid flow through the valve 100 that is possible. It may also be appreciated that, due to the mirrored design of the canal 126, the valve stem 112 can be rotated to the fully-closed position by being rotated in either a counterclockwise direction or in a clockwise direction in order to change these amounts and, by doing so, modulate fluid flow through the valve 100. More specifically, the valve stem 112 is configured to rotate counterclockwise (CCW) within the valve body 102 from the fully-open position, through an infinite number of partially-open positions, and to a first fully-closed position. The valve stem 12 is further configured to rotate within the valve body 102 from the fully-open position clockwise (CW), through an infinite number of partially-open positions, and to a second and different fully-closed position. Thus, the valve 100 is described as being "bi-directional" since it can be rotated in either a CCW or a CW direction. The fully-open and two fully-closed positions are visible in FIG. 4. As noted above, in preferred embodiments, and angle of approximately 110° separates the fully-open position from each of the fully-closed positions.

Figure 8A:
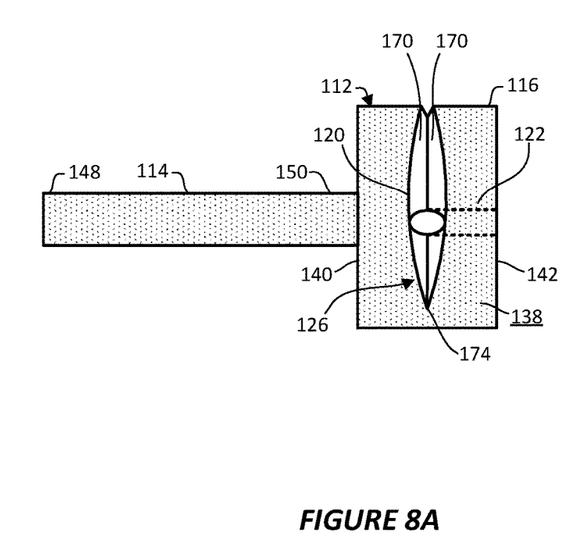
FIG. 8A is a side view illustrating a valve stem of FIG. 6A shown in a fully-closed rotational position.
Figure 8B:
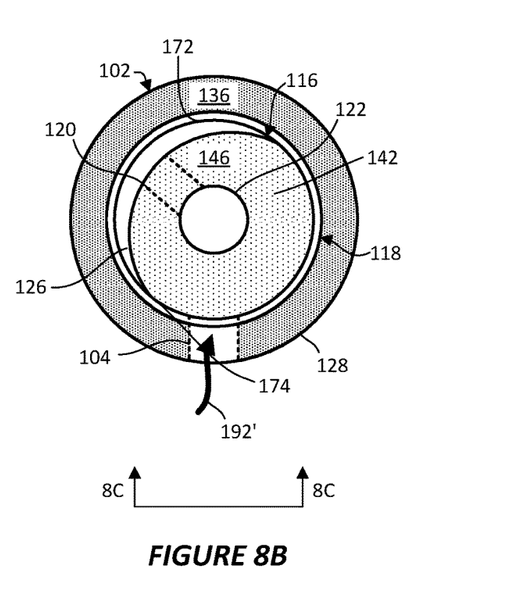
FIG. 8B illustrates the valve stem shown in FIG. 8A placed within a valve body.
Figure 8C:
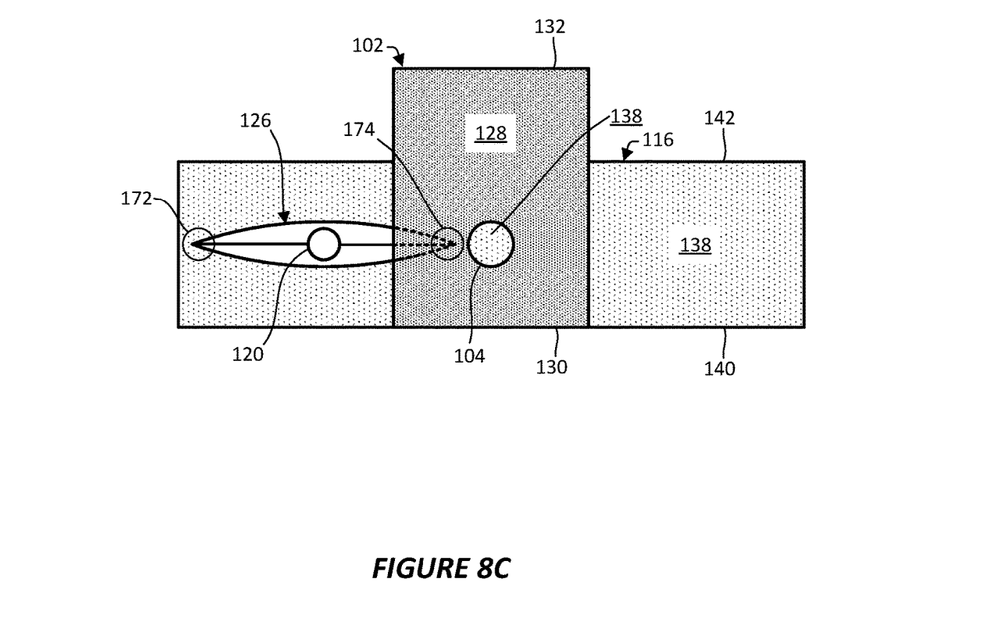
FIG. 8C is a sectional view of the valve body of FIG. 8B shown along line "8C-8C" and also showing the valve stem head in an "unrolled" or flattened configuration in order to better illustrate the relative position of a fluid inlet of the valve body to a fluid inlet of the valve stem.

Finally, with reference again to FIGS. 2 and 5 and with reference to FIGS. 8A-8C, valve 100 is shown in one of the two fully-closed rotational positions. In these positions, valve stem 112 has been rotated approximately 100°-130° within the valve body 102 such that the second fluid inlet 120 is pointed in northwestern direction but the first fluid inlet 104 is pointed in southern direction. As shown in FIG. 8C, by arrow 192', which represents a fluid not entering the valve body 102, the path for fluid flow is completely obstructed and the fluid cannot pass through the first fluid inlet 104 to enter the second fluid inlet 120 of the valve stem head 116.

Although this description contains many specifics, these should not be construed as limiting the scope of the invention but as merely providing illustrations of some of the presently preferred implementations thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. A valve stem for use in a fluid flow control valve having a valve body configured to receive a portion of the valve stem and to enable the valve stem to selectively rotate within the valve body between a fully-open position, where fluid is permitted to flow through the fluid flow control valve, and a fully-closed position, where fluid is prevented from flowing through the fluid flow control valve, the valve stem comprising:
   an elongate valve stem arm having a first end and a second end; and
   a valve stem head integrally formed with and fixedly attached to the second end of the valve stem arm, the valve stem head having:
      a continuous peripheral wall having opposing front and back sides;
      a front face located on the front side of the peripheral wall, wherein the second end of the valve stem arm is fixedly attached to the front face of the valve stem head;
      a back face located opposite the front face on the back side of the peripheral wall;
      a second fluid inlet formed in the valve stem head;
      a second fluid outlet formed in the valve stem head;
      a fluid passage that carries fluid into the valve stem via the second fluid inlet and then out of the valve stem via second fluid outlet; and
      an elongate canal formed by opposing walls in the peripheral wall and extending circumferentially around a portion of the valve stem head such that a first end of the canal is located at a first circumferential location of the valve stem head and a second end of the canal is located at a second circumferential location of the valve stem head,
      wherein:
         the second fluid inlet is disposed in the canal;
         the second fluid inlet is formed in the peripheral wall of the valve stem head;
         the second fluid outlet is formed in the back face of the valve stem head;
         outer surface portions of the peripheral wall that are located adjacent the opposing walls of the canal are configured to restrict fluid flow from the valve body into the valve stem in order modulate fluid flow through the fluid flow control valve; and
         the canal forms a crescent shape when viewed from one of the opposing front and back sides of the peripheral wall and opposing ends of the crescent shape are tapered such that a widest portion of the crescent shape of the canal is located between the first and second ends of the canal.

2. The valve stem of claim 1 wherein the canal is formed by a pair of opposing planar walls.

3. An oil metering valve that includes the valve stem of claim 1, the oil metering valve further comprising:
   a valve body having:
      a first fluid inlet;
      a first fluid outlet;
      a valve stem receiver configured to receive the valve stem head of the valve stem;
      a fluid passage that carries fluid into the valve body via the first fluid inlet, through the valve stem receiver, and then out of the valve body via first fluid outlet;
   a bearing for enabling the valve stem head be rotated with respect to the valve body; and
   a cap having an aperture, wherein the valve stem is sized and configured such that the valve stem arm may be inserted through the aperture of the cap and the cap may be fixedly attached to the valve body,
   wherein, when the valve stem is located within the valve stem receiver, the outer surface portions of the peripheral wall are configured to be located adjacent the first fluid inlet of the valve body and to provide a variable restriction to fluid flowing from the valve body into the valve stem based on the rotational position of the valve stem relative to the valve body in order modulate fluid flow through the fluid flow control valve.

4. The valve stem of claim 1 wherein:
   the canal is formed by a pair of opposing walls that each have an inner end and an outer end,
   the inner ends of the opposing walls meet at an intersection point and form a base of the canal, and
   each of the opposing walls is angled outwards from one another and from the intersection point and towards one of opposing front and back sides of the peripheral wall.

5. The valve stem of claim 4 wherein the outer ends of the opposing walls are spaced apart by a distance D, and wherein distance D continuously changes between the first and second ends of the canal.

6. The valve stem of claim 1 further comprising a center of the canal that is circumferentially centered between the first and second ends of the canal, wherein the second fluid inlet is located at the center of the canal, the canal including:
   a first portion located between the center of the canal and the first end of the canal that has a first canal shape; and
   a second portion located between the center of the canal and the second end of the canal that has a second canal shape.

7. The valve stem of claim 6 wherein a shape of the first portion of the canal mirrors a shape of the second portion of the canal about a line passing through the center of the canal.

8. The valve stem of claim 7 wherein the first canal shape and the second canal shape, in combination, form a pointed oval shape that is centered at the center of the canal and at the second fluid inlet.

9. The oil metering valve of claim 3 wherein the valve stem is configured to rotate within the valve body from the fully-open position counterclockwise to a first fully-closed position and further configured to rotate within the valve body from the fully-open position clockwise to a second fully-closed position.

10. The oil metering valve of claim 9 wherein the valve body further comprises:
   a continuous peripheral wall having opposing front and back sides;
   a front face located on the front side of the peripheral wall; and
   a back face located opposite the front face on the back side of the peripheral wall.

11. The oil metering valve of claim 10 wherein the first fluid inlet and first fluid outlet are each formed in the continuous peripheral wall of the valve body and the valve stem receiver is disposed in the front face of the valve body.

12. The oil metering valve of claim 9 further comprising a rotating indicator collar mounted to the first end of the valve stem arm.

13. The oil metering valve of claim 12 further comprising a stationary flow indicator having a visual readout that cooperates with the rotating indicator to indicate an open-close position of the valve as the valve stem is rotated within the valve body.

14. A bi-direction fluid flow metering valve comprising:
   a valve body having:
      a first fluid inlet;
      a first fluid outlet;
      a valve stem receiver; and
      a first fluid passage that directs fluid from the first fluid inlet, through the valve stem receiver, and then out of the first fluid outlet;
   a valve stem having:
      an elongate valve stem arm having a first end and a second end;
      a valve stem head integrally formed with and fixedly attached to the second end of the valve stem arm, the valve stem head sized and configured for rotatable insertion within the valve stem receiver of the valve body and the valve stem head having:
         a peripheral wall;
         a second fluid inlet and a second fluid outlet that are each formed in the valve stem head;
         a second fluid passage that directs fluid from the second fluid inlet and then out of the second fluid out;
         an elongate canal formed by opposing walls formed in the peripheral wall and extending circumferentially around a portion of the valve stem head such that a first end of the canal is located at a first circumferential location of the valve stem head and a second end of the canal is located at a second circumferential location of the valve stem head, wherein the second fluid inlet is disposed in the canal; and
         wherein the canal has a pointed oval shape in a first orientation and a crescent shape in a second orientation,
   wherein, when the valve stem is located within the valve stem receiver, outer surface portions of the peripheral wall that are located adjacent the opposing walls of the canal are configured to be located adjacent the first fluid inlet of the valve body and to provide a variable restriction to fluid flowing from the first inlet of the valve body into canal based on a rotational position of the valve stem relative to the valve body in order modulate fluid flow through the flow metering valve, and
   wherein the valve stem is configured to rotate within the valve body:
      counterclockwise from a fully-open position, where fluid is permitted to flow through the fluid flow metering valve, to a first fully-closed position, where fluid is prevented from flowing through the fluid flow metering valve; and
      clockwise from the fully-open position to a second fully-closed position.

15. The bi-direction fluid flow metering valve of claim 14 wherein:
   the opposing walls of the canal each have an inner end and an outer end;
   the inner ends of the opposing walls meet at an intersection point and form a base of the canal;
   the opposing walls are angled outwards from one another and from the intersection point and towards opposing front and back sides of the peripheral wall; and
   the outer ends of the opposing walls are spaced apart by a distance D that continuously changes between the first and second ends of the canal.

* * * * *